United States Patent [19]

Koetje

[11] Patent Number: 4,693,031
[45] Date of Patent: Sep. 15, 1987

[54] LINE CONNECTOR

[76] Inventor: John R. Koetje, 1314 McLean Rd., Mount Vernon, Wash. 98273

[21] Appl. No.: 694,055

[22] Filed: Jan. 22, 1985

Related U.S. Application Data

[63] Continuation-in-part of Ser. No. 684,912, Dec. 18, 1984, abandoned.

[51] Int. Cl.⁴ .................. A01K 71/00; A01K 93/00
[52] U.S. Cl. .................................. 43/44.91; 43/10; 43/44.9; 43/43.1
[58] Field of Search ............... 43/9, 10, 44.9, 43.1, 43/44.91; 24/129 A, 115 G, 115 L, 136 K, 136 L

[56] References Cited

U.S. PATENT DOCUMENTS

| | | | |
|---|---|---|---|
| 11,717 | 2/1854 | Pearson . | |
| 83,493 | 10/1868 | Harper . | |
| 1,272,272 | 7/1918 | Kell | 24/129 A |
| 2,100,088 | 11/1937 | Robertson | 224/5 |
| 2,315,322 | 3/1943 | Fenley | 43/49 |
| 2,461,833 | 2/1949 | Mercier | 43/28 |
| 2,474,498 | 6/1949 | Schwabe | 43/49 |
| 2,603,905 | 7/1952 | Brzezinski | 43/43.11 |
| 2,753,652 | 7/1956 | Romaine | 43/43.1 |
| 2,932,072 | 4/1960 | Pruchnow | 24/129 |
| 3,102,357 | 9/1963 | Luketa | 43/9 |
| 3,127,693 | 4/1964 | Luketa | 43/9 |
| 3,192,662 | 7/1965 | Hoyle | 43/44.91 |
| 3,545,120 | 12/1970 | Takaoka | 43/44.9 |
| 4,501,564 | 2/1985 | Cairone, Sr. | 43/43.1 |

FOREIGN PATENT DOCUMENTS

| 551445 | 1/1958 | Canada | 43/44.91 |
|---|---|---|---|
| 900714 | 5/1972 | Canada | 43/7 |

Primary Examiner—Kurt Rowan
Attorney, Agent, or Firm—Christensen, O'Connor, Johnson & Kindness

[57] ABSTRACT

A connector (12) for detachably interconnecting the intermediate portions of first and second lines includes a body (32) formed with a first cross hole (34) and a slit (36) extending from the outer periphery of the body crosswise through a portion of the body to intersect the first cross hole (34) along the length thereof. The intermediate portion of the first line (30) is slid transversely through the slit (36) into engagement within the first cross hole. A second cross hole (40) extends through the body at an orientation generally transversely to the first cross hole (34) to cross through slit (36). A groove (42) extends around the outer periphery of the body (32) and intersects the ends of the second cross hole (40). A second line (22), doubled upon itself, is threadably engaged through the second cross hole (40) and then looped around the body (32) to seat within groove (42), thereby preventing the second line from being detached from the body when the ends of the second line are drawn taut. Also the second line (22), being disposed between the first line (30) and the outer periphery of the slit (36), prevents the first line (30) from being disengaged from the body (32).

12 Claims, 10 Drawing Figures

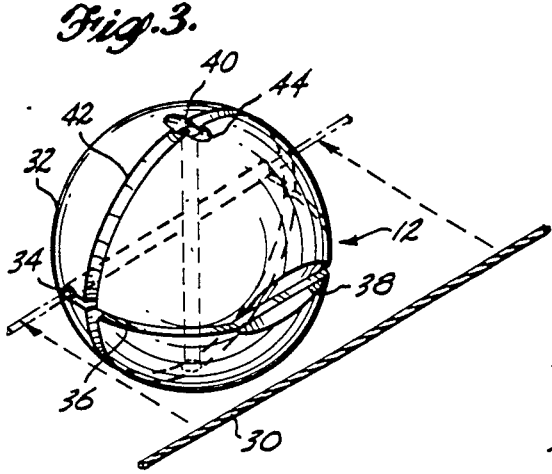
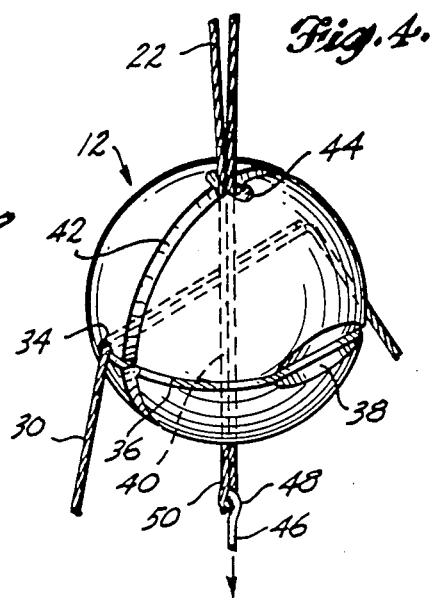
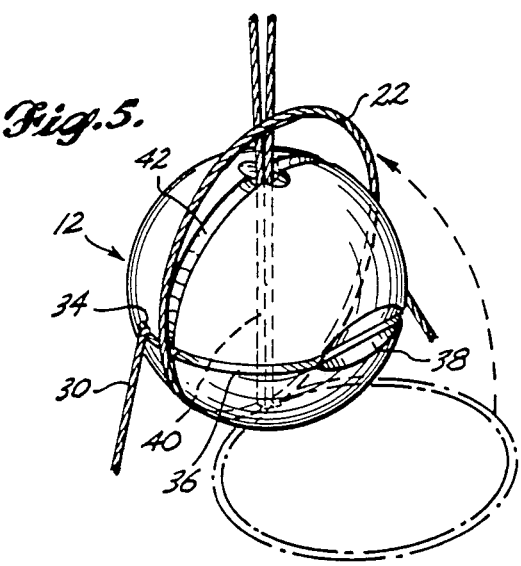
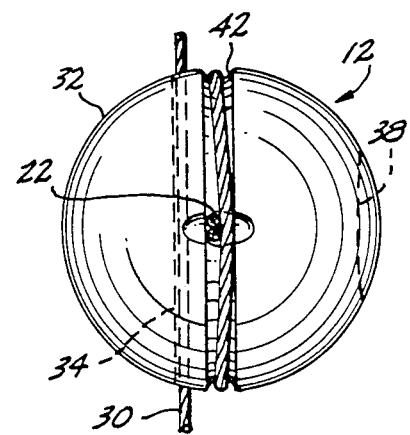
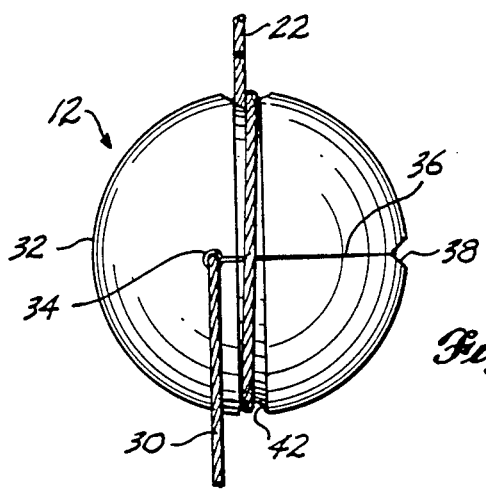

LINE CONNECTOR

CROSS REFERENCE TO RELATED APPLICATION

This is a continuation-in-part of U.S. patent application Ser. No. 684,912, filed Dec. 18, 1984, now abandoned.

TECHNICAL FIELD

The present invention relates to a connector for interconnecting two lines at locations intermediate the ends thereof, and more particularly to a connector for quickly and securely interconnecting a fishing net to one or more support lines.

BACKGROUND OF THE INVENTION

It is often necessary to interconnect together two or more lines at locations intermediate the ends of lines. One example of such a need is to interconnect a fishing net to its support lines. For instance, gill net assemblies, known in the trade as "shackles," are composed of a length of netting or webbing having its upper edge portion attached to a float line having a cork or other type of flotation device attached thereto for supporting the upper edge of a gill net. Typically, the upper margin of the gill net is attached to the float line with a series of twines which extend downwardly from the float line to interconnect with the upper margin of the net. The gill net shackle also includes a weight line having a plurality of weights, such as lead, attached thereto, with the weight line tied to the lower margin of the net with twines comparable to those used to fasten the upper margin of the net to the float line. Examples of this type of gill net construction are shown in U.S. Pat. No. 3,545,120.

In the present application the term "support line" will be used to refer to either the float line, the weight line or similar lines used to support and/or control fishing nets. As will be appreciated, the float line and weight line cooperatively support the net as a vertical curtain in the water.

As is well known in the art, the netting portion of fishing nets, such as gill nets, are quickly worn out or damaged, often after only one or two days' use. Because of the high cost of the float and weight lines, when the netting is worn out, the entire shackle cannot simply be discarded, rather the old netting is removed from the float and weight lines and replaced. As will be appreciated, this is an extremely laborious and time-consuming, manual procedure. Because the fishing season for many types of fish is now limited by government regulations to a relatively short duration, often for only a few days, heretofore, it has not been economically feasible for fishermen to replace the worn out or damaged netting of shackles. As a result, fishermen must purchase a sufficient number of shackles for the entire fishing season. However, in most fishing areas, by regulations, the number of shackles which may be carried onboard a fishing vessel at any particular time is limited. As a result, fishermen typically must store extra shackles on shore. Then, when the nets onboard have worn out or become damaged, the boat must return to shore to off load the old shackles and take on the new ones. As will be appreciated, valuable fishing time is lost during the trip(s) to and back from shore.

There is now, however, a limitation on the quantity of netting which can be kept onboard as long as it is not attached to the float and weight lines. Thus, it is theoretically possible to keep spare netting onboard and then replace the netting of assembled shackles as needed. However, as noted above, because of the slow, manual operation of attaching the netting to the float and weight lines, heretofore, this has not been a viable alternative to fisherman.

Accordingly, the present invention addresses the problem of quickly attaching together two or more lines at locations intermediate the ends of the lines, and particularly concerns a novel connector to quickly and simply attaching fishing nets to support lines and subsequently detach the nets from the lines.

SUMMARY OF THE INVENTION

In accordance with the present invention, a connector is provided for interconnecting two lines at locations intermediate the ends of the lines. The connector is in the form of a body having a first cross hole extending therethrough and a slit extending from the outer periphery of the body crosswise through a portion of the body to intersect the first cross hole along the entire length thereof. The intermediate portion of a first line is slid, transversely to its length, through the slit to engage within the first cross hole. A second cross hole extends through the body at an orientation generally transversely to the first cross hole to intersect and cross through the first cross hole. Alternatively, the second cross hole is offset from the first cross hole and intersects and passes through the slit. The second cross hole is sized to enable the second line, doubled upon itself, to be drawn therethrough.

The body further includes a groove which extends around the outer periphery of the body and intersects the ends of the second cross hole to receive the looped central portion of the second line which has been drawn through the second cross hole after the first line has been disposed within the first cross hole. Once the central portion of the second line has been engaged within the groove, the second line cannot be detached from the body by pulling on the ends thereof, rather, pulling on the ends of the second line forces the looped central portion of the line more tightly within the groove. In addition, the second line, being interposed between the first line and the outer periphery of the slit, prevents the first line from being disengaged from the body by sliding through the slit.

In a further aspect of the present invention, the connector of the present invention is adapted to interconnect a fishing net to one or more support lines. For this function, the connector body preferably is rounded in shape to prevent the connector for snagging with the net or suspension lines, especially when the net is being reeled in or payed out from a drum. Also, the first cross hole is adapted to receive either the net twine or the suspension line twine (first twine) which has been slid through the slit. Thereafter, the other of the net twine or suspension line twine (second twine), being doubled upon itself, is drawn through the second cross hole to pass between the first twine and the portion of the slit distal from the first cross hole and also so that a portion of the twine, in the form of a bight, extends beyond the second cross hole. This portion of the second twine is looped back around the connector body and placed within the groove. Thus, when the ends of the second twine are pulled taut, the bight portion of the second twine is drawn tightly within the groove to prevent the second twine from disengaging from the connector. Also, the second twine prevents the first twine from disengaging from the connector by blocking the removal of the first twine from the slit.

In accordance with a further aspect of the present invention, a lead-in slot extends along at least a portion of the intersection of the slit with the outer periphery of the body and preferably along a portion of the slit located furthest or most distal from said first cross hole. The lead-in slot helps guide the first line into sideways engagement within the slit.

BRIEF DESCRIPTION OF THE DRAWINGS

The details of typical embodiments of the present invention will be described in connection with the accompanying drawings, in which:

FIGS. 3, 4 and 5 are perspective views similar to FIG. 2 illustrating the manner in which the first and second lines are interconnected together with the connector of the present invention;

FIG. 6 is a side elevational view of the connector illustrated in FIG. 2;

FIG. 7 is a top plan view of the connector illustrated in FIG. 2;

DESCRIPTION OF THE INVENTION

Figure 1:
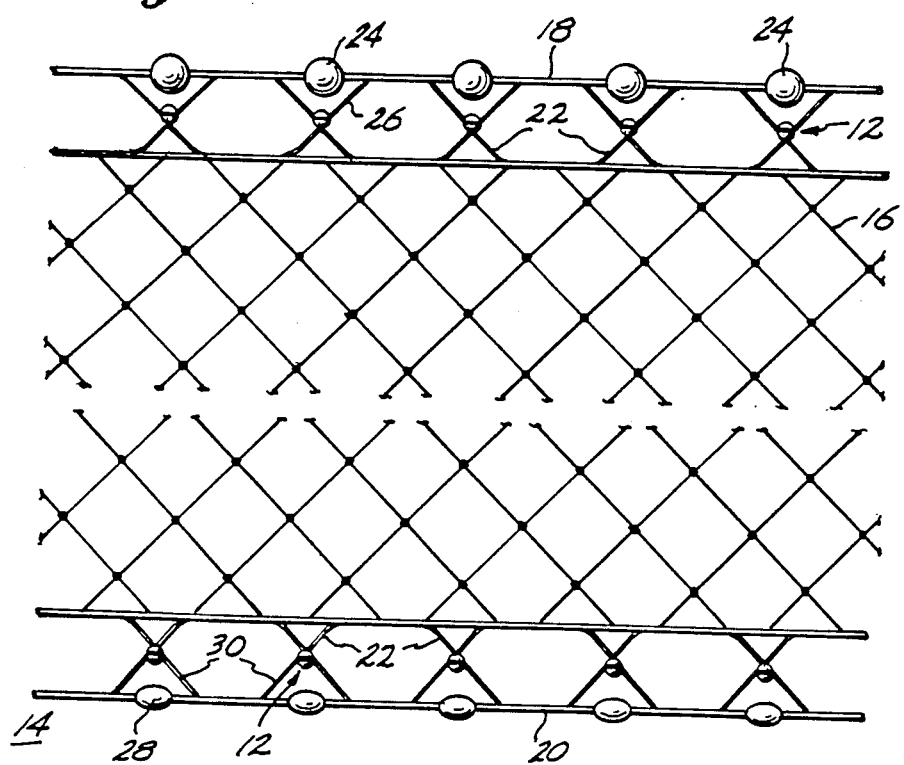
FIG. 1 is a partially schematic view illustrating line connectors constructed in accordance with the present invention employed to interconnect a fishing net with an overhead float line and a lower weight line.
Figure 2:
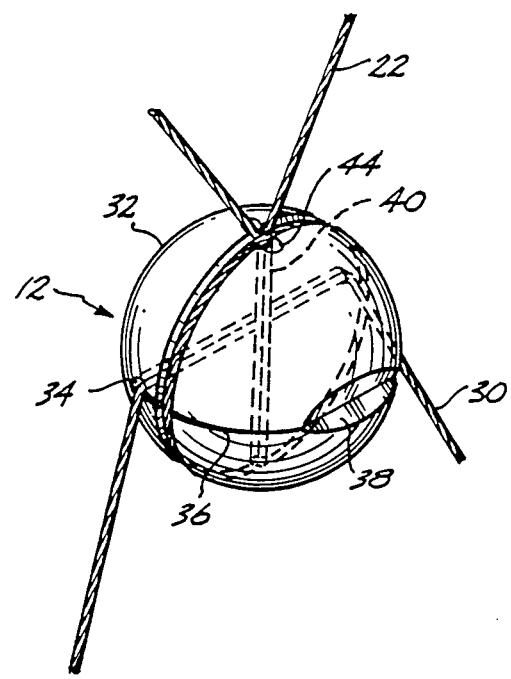
FIG. 2 is an enlarged isometric view of the line connector of the present invention shown as interconnecting the intermediate portions of first and second lines.

Referring initially to FIG. 1, a plurality of connectors 12 constructed according to the present invention are illustrated as being employed to form a gill net assembly or shackle 14. Shackle 14 includes netting or webbing 16 supported as a vertical curtain in the water between an overhead float line 18 and an underlying weight line 20. The net is conventional in nature and can be composed of braided or monofilament nylon or other plastic, or synthetic material. Alternatively the net can be constructed of natural materials. As can be appreciated, the width and height of the netting, the size or gauge of the net openings, and the thickness or weight of the material used to construct the netting are dependent upon various parameters, such as the type of fish being sought and the fishing technique being used, whether gill netting, trolling or purse seining.

Net twines 22 are spaced apart along the upper and lower margins of netting 16 to form loops that hang from the netting. The ends of the twines are tied or otherwise secured to the salvage or edge portions of the netting. It will be appreciated that net twines 22 can be constructed separately from netting 16 and tied thereto, or alternatively can be formed as an integral part of the netting.

A plurality of floats 24 are spaced apart along the length of float line 18 and are secured to the float line by any conventional means. Floats 14 may be composed of cork, foam or other suitable types of buoyant material. A plurality of float line twines 26 are spaced apart along float line 18 to correspond with the locations of associated net twines 22. The ends of the float twines are tied or otherwise secured to the float line to allow the twines to hang below the float line. As explained more fully below, connectors 12 are employed to quickly and conveniently detachably connect the float line twines 26 to corresponding net twines 22.

As noted above, a weight line twine 20 extends beneath and along the length of the lower edge portion or salvage of netting 16. A plurality of weights 28, composed of lead or other suitable types of dense material, are spaced apart along the length of weight line 20. Weights 28 may be secured to the weight line by any conventional means. The ends of a plurality of weight line twines 30 are tied or otherwise secured to weight line 20 at locations corresponding to the locations of associated net twines 22 so that the twines hang from the weight line. As with float line 18, connectors 12 of the present invention are employed to detachably interconnect weight line twines 30 to net twines 22.

It is to be understood that rather than being independent components, the float line twines 26 and weight twines 30 can be composed of a continuous length of twine that is tied or otherwise fastened to the float and weight twines 18 and 20, respectively, so as to form loops that hang from the float and weight lines. Alternatively, the twines 26 and 30 can be integrally formed with the float and weight lines.

Next, more specifically considering the construction of connectors 12, FIGS. 2-7 illustrate the connector being employed to interconnect a net twine 22 to a weight line twine 30. Of course, connector 12 may be used to interconnect the intermediate portions of other types of lines which may or may not be associated with fishing nets. Nevertheless, as an illustrative, but not limiting example, connector 12 will be described in association with the gill net 16 of FIG. 1, and more specifically as interconnecting a weight line twine 30 to a net twine 22. It is to be understood that the following description of the construction and use of the connector also applies not only to the attachment of float line twine 26 to net twine 22, but also generally to the connection of the intermediate portions of two or more lines.

Connector 12 is shown generally in the form of a generally spherical body 32 having a first cross hole 34 extending generally diametrically through the body for receiving the twine of the weight line or float line. In cross section, first cross hole 34 is formed large enough to enable twines 26 and 30 to freely slide longitudinally relative to the cross hole. A narrow slit 36 extends from the outer surface or periphery of body 32, across a portion of the body to intersect first cross hole 34 along the length thereof. The slit 36 is illustrated as being planar and extending quadrant-wise across the body, but it need not necessarily be of this configuration. A slot 38 is formed along a portion of the intersection of slit 36 with the outer periphery of body 32, ideally along the portion of the slit opposite or furthest from cross hole 34. Slot 38 functions to help guide weight line twine 30 into engagement within slit 36.

As illustrated most clearly in FIGS. 2-7, connector 12 also includes a second cross hole 40 extending generally diametrically through body 32 at a location slightly offset from first cross hole 34; thus passing through slit 36. Although a second cross hole 40 is illustrated as being disposed orthogonally relative to first cross hole 34, the two cross holes may be disposed at other relative orientations without departing from the scope or spirit of the present invention. In cross section, second cross hole 40 is sized to freely and threadably receive therethrough net twine 22 doubled upon itself.

Connector 12 further includes rather shallow groove 42 extending entirely and generally circumferentially around the outer periphery of body 32 and intersecting both ends of second cross hole 40. In cross section, groove 42 is sized to receive a looped central portion of net twine 22. Ideally, groove 42 is deep enough to recess the net twine below the outer surface of body 32, thereby reducing the likelihood that the portion of the net twine disposed within the groove will chafe against weights 28, weight line 20 or other objects during use of shackle 14, such as while the shackle is being reeled in or payed out from the fishing vessel.

Preferably, a relatively short slot 44 extends transversely across groove 42 at the locations at which the ends of second cross hole 40 intersect groove 42. Although not essential, ideally slots 44 extend downwardly into body 32 to a depth deeper than the bottom of slot 42 to enable a fisherman or workman to place a tool, such as tool 46 shown in FIG. 4, beneath the looped portion of twine 22 to remove the twine from groove 42. Also rather than extending transversely from both sides of groove 42, slots 44 can be formed to extend from only one side of the slot.

Preferably, body 32 is constructed from a corrosion resistant, durable but lightweight and readily moldable material, such as nylon or other type of plastic. Ideally, the material used to form body 32 also is sufficiently resilient to enable slit 36 to separate slightly to allow twine 30 to readily slide through slit 36 when engaging the twine into or removing the twine from first cross hole 34. It will be appreciated that the optimum size of body 32 is dependent upon various factors, such as the structural strength of the material from which the body is constructed, the level of the load which must be carried by the body and the sizes of twines which extend through cross holes 34 and 40. Also, body 32 should be large enough to be easily handled by fishermen, but not too large so as to not efficiently utilize the material from which the body is composed. Applicant has found that for gill nets used for fishing for salmon, an optimum width or diameter for body 32 is approximately one-half to threequarters of an inch. However, the ideal size of the body will vary in accordance with the parameters noted above.

Body 32 is illustrated in FIGS. 2–7 as being generally spherical in shape. Forming the body in this shape reduces the likelihood that the body will become snagged on the net or the float or weight or other type of support line, especially as shackle 14 is being reeled onto or payed out from the fishing vessel. It is contemplated that body 32 may be formed in other rounded or rondure shapes, such as the oblong body 32' shown in FIG. 8 and the generally disk shaped body 32" shown in FIGS. 9 and 10, and still provide these advantages. In addition, body 32 may be formed in other nonrounded shapes, such as square or polygonal, especially for uses other than for attaching fishing nets to support lines.

In FIGS. 2–7, the cross holes 34 and 40 are illustrated as extending through the central portions of body 32 and as being disposed substantially orthogonally to each other. It will be appreciated that the cross holes may extend through other locations of the body and that they may be disposed at other orientations relative to each other without departing from the spirit or scope of the present invention, especially if such relocation of the cross holes would be helpful for the particular application for which connector 12 is being used.

To attach weight line 20 to netting 16, as shown in FIG. 3, a weight line twine 30 is initially slid sideways through slit 36 and into first cross hole 34. Slot 38 is useful in guiding twine 30 into engagement within the slit. Thereafter, the net twine 22 is threaded downwardly through second cross hole 40. Preferably, this is accomplished by inserting the hook-shaped upper end 48 of an elongate tool, such as tool 46, upwardly through cross hole 40 to engage the net twine and draw it downwardly through the cross hole so that the net twine forms a bight 50 that extends below body 32. To facilitate entry of tool 46 into the second cross hole, the ends of the cross hole may be beveled.

Next, the bight portion of net twine 22 is looped or wrapped upwardly around body 32 and placed within groove 42. As the upper ends of twine 22 are pulled taut, the looped portion of the twine is securely seated into groove 42, thereby preventing disengagement of the net twine from connector 12. Also, the portions of the net twine that extend downwardly through the second cross hole 40 and the portions of the net twine that are seated within the sections of groove 42 which extend across slit 36 prevent disengagement of weight line twine 30 from connector 12 by not allowing the weight line twine to pass outwardly through slit 36. Moreover, when net twine 22 is drawn taut, slit 36 is pressed closed, thereby enhancing the structural integrity of body 32 and enabling it to carry higher loads than if slit 36 remained open. The closing of slit 36 in this manner also helps maintain weight line twine 30 captive within cross hole 34.

It will be appreciated that when connector 12 is in the assembled condition described above, the connector is free to slide along the length of weight line twine 30 to align the weight line twine with the net twine 22. Preferably, the outer end portions of the first cross hole are beveled or radiused to reduce wear of the weight line by rubbing or chafing against the ends of the cross hole.

Weight line 20 is disconnected from net 16 by reversing the abovedescribed procedure. To this end, a tool, such as tool 46, may be conveniently engaged within one of the cross slots 44 adjacent the upper end of cross hole 40 to slide beneath and grasp twine 22 and then remove the twine from circumferential slot 42. Thereafter, the bight portion of the net twine is withdrawn from second cross hole 40 which then permits slit 36 to separate so that the weight line twine 30 may be removed from first cross hole 34 by sliding outwardly through the slit. In situations in which the net 16 is to be discarded, it may be preferable to remove twine 22 from connector 12 by cutting the twin, such as at slot 44.

It is to be understood that rather than engaging weight line twine 30 or float line twine 26 into the first cross hole 34 and the net twine into the second cross hole 40, the locations of the twines can be reversed. As such, the net twine 22 is engaged within the first cross hole 34 and the weight line or float line twine is engaged within the second cross hole. With this exception, the connector 12 is utilized in the same manner as described above and also provides the advantages as described above.

It will be appreciated that by the above construction, connector 12 of the present invention may be employed to easily and quickly attach the twines of a fishing net to various support lines, such as float lines and weight lines. In the fishing industry, this is particularly advantageous in that the present invention allows fishermen to carry spare netting onboard to quickly and conveniently replace worn out or damaged netting. This eliminates the need for fishermen to purchase large numbers of spare shackles and to store such shackles on shore until needed. Furthermore, the invention of the present invention permits a gill net shackle or other type of net to be reeled in, for instance, with a power drum while minimizing the likelihood that the connector will snag on the netting or support lines.

It will also be appreciated that the present invention may be employed in other uses in addition to connecting a fishing net to a support line. The present invention may be utilized in virtually any situation in which it is desired to quickly and conveniently detachably interconnect together the intermediate portions of two or more lines.

Figure 8:
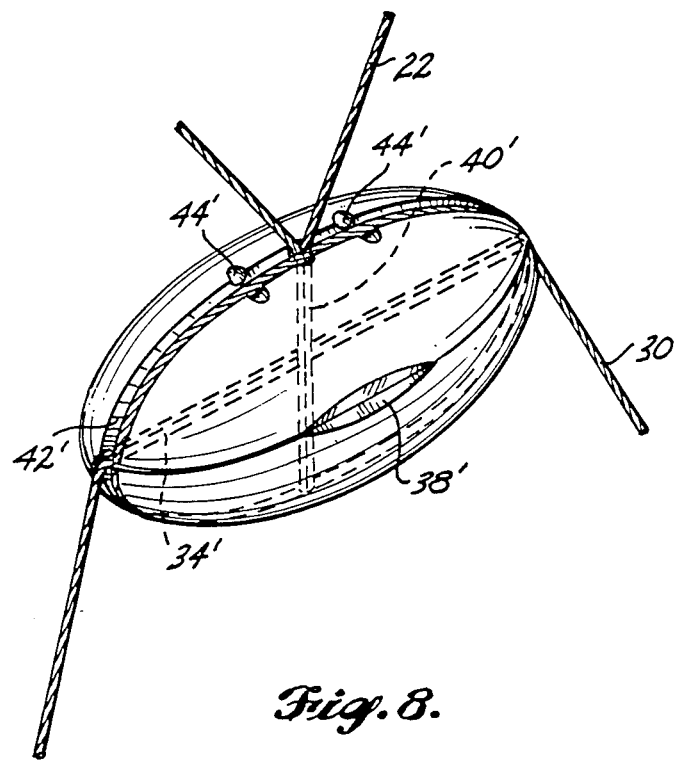
FIG. 8 is a perspective view of another preferred embodiment of the present invention shown as interconnecting the intermediate portions of two lines.

FIG. 8 illustrates another preferred embodiment of the present invention wherein a connector 12' is illustrated as having a body 32' of a generally oblong shape rather than being generally spherical in the manner of connector 12 shown in FIGS. 1-7. Also, instead of a being offset from the first cross hole 34', the second cross hole 40' extends through the first cross hole such that the ends of the first cross hole also intersect groove s42'. In addition, a pair of cross slots 44' extend across groove 42' on each side of the locations at which the ends of second cross hole 40' intersect groove 42'. With these exceptions, connector 12' is constructed and may be utilized in the same manner as connector 12 discussed above. As such, connector 12' provides substantially the same advantages as provided by connector 12.

Figure 9:
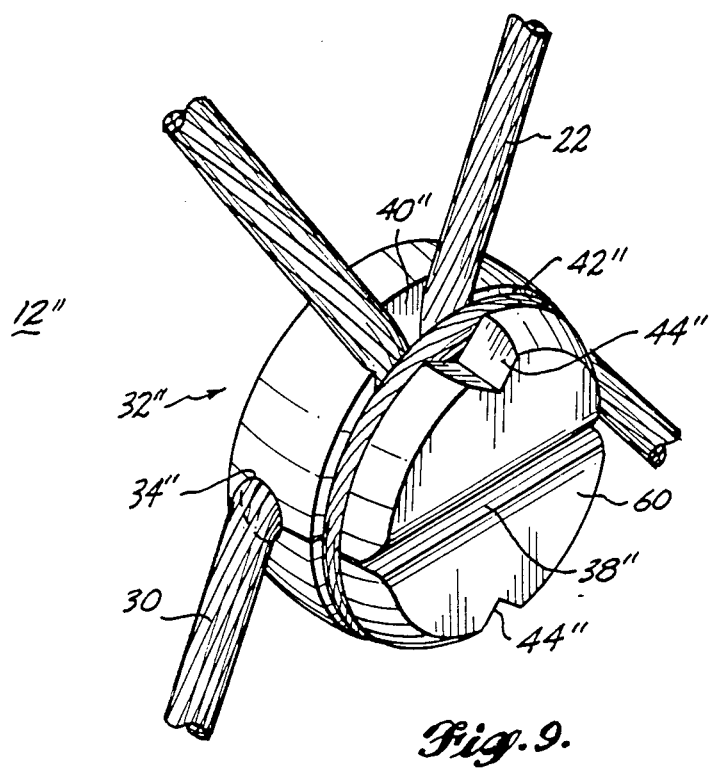
FIG. 9 is a perspective view of a further preferred embodiment of the present invention shown as interconnecting the intermediate portions of two lines; and, FIG. 10 is a side elevational view of the connector shown in FIG. 9.
Figure 10:
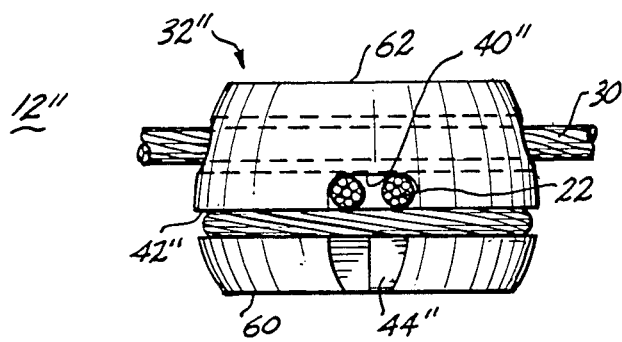

FIGS. 9 and 10 illustrate a further preferred embodiment of the present invention wherein connector 12" is illustrated as having a body 32" of a generally disk shape rather than being generally spherical in the manner of connector 12 shown in FIGS. 1-7. As such, body 32" has a forward face 60 and a rear face 62. Second cross hole 40" is offset from first cross hole 34", and is generally oblong in cross section to accommodate twine 22 doubled upon itself. A slot 38" is formed along the intersection of slit 36" with forward face 60, and thus extends across the width of the forward face. Faces 60 and 62 are illustrated as being generally flat or planar; however, it is to be understood that these faces do not necessarily have to be planar, but may be of other shapes, such as convex. A generally "V"-shaped cross slot 44" extends transversely from groove 42" at each end of second cross hole 40" toward forward face 60 to intersect the forward face. Slot 44" serves the same function as slots 44 and 44' discussed above, i.e., to receive a tool, such as tool 46 shown in FIG. 4, for removing twine 22 from groove 42". With these exceptions, connector 12" is constructed and may be utilized in the same manner as connectors 12 and 12' discussed above. As such, connector 12" provides substantially the same advantages as provided by connectors 12 and 12'.

As will be apparent to those skilled in the art to which the invention is addressed, the present invention may be embodied in forms other than those specifically disclosed above without departing from the spirit or essential characteristics of the invention. The particular embodiments of connectors 12, 12', and 12", described above, are therefore to be considered in all respects as illustrative and not restrictive. The scope of the present invention is as set forth in the appended claims, rather than being limited to the examples of connectors 12, 12', and 12" set forth in the foregoing description.

The embodiments of the invention in which an exclusive property or privilege is claimed are defined as follows:

1. A connector for connecting two lines at locations intermediate the ends thereof, comprising:
   (a) a body;
   (b) a first cross hole extending through said body;
   (c) a slit extending from the outer periphery of said body, through a portion of said body, to intersect said first cross hole along the length thereof;
   (d) a second cross hole extending through said body generally transversely to said first cross hole, said second cross hole intersecting either said first cross hole or said slit;
   (e) a first groove extending around substantially the entire outer periphery of said body to intersect the end portions of said second cross hole, but not along the length of said second cross hole that extends between the ends of said second cross hole; and,
   (f) wherein said second cross hole is disposed at a location offset from the first cross hole in the direction towards the portion of said body through which said slit extends.

2. The connector according to claim 1, wherein said second cross hole is disposed generally perpendicularly to said first cross hole.

3. The connector according to claim 1, further comprising a lead-in slot disposed along at least a portion of the intersection of said slit with the outer periphery of said body.

4. A connector for attaching a fishing net to a support line, with the net including a plurality of spaced-apart net twines attached to the edge portions of the net and with the support line including a plurality of support line twines spaced along the support line, said connector comprising:
   (a) a body;
   (b) a first cross hole for reception of a first twine composed of either the net twine or the support line twine;
   (c) a slit extending from the outer periphery of said body, through a portion of said body to intersect said first cross hole along the length thereof, said slit adapted to permit passage of the first twine through said body to engage within said first cross hole;
   (d) a second cross hole extending through said body generally transversely to said first cross hole and intersecting either said first cross hole or said slit for reception of a second twine composed of the other of the net twine or the support line twine doubled upon itself; and,
   (e) a groove extending around substantially the entire periphery of said body to intersect the end portions of the second cross hole but not the length of said second cross hole intermediate the ends of said second cross hole for reception of a looped, central portion of the second twine extending through said second cross hole thereby to render captive the first twine in said first cross hole.

5. The fishing net connector according to claim 4, wherein said second cross hole is offset within said body from said first cross hole in the direction towards the portion of said body through which said slit extends, and said slit extending through said second cross hole.

6. The fishing net connector according to claim 5, wherein said second cross hole extends generally perpendicularly to said first cross hole.

7. The fishing net connector according to claim 6, further comprising a lead-in slot disposed along at least a portion of the intersection of said slit with the outer periphery of said body to aid in the engagement of the first twine into said slit.

8. The fishing net connector according to claim 4, wherein said body is generally of a rounded shape.

9. The fishing net connector according to claim 8, wherein said second cross hole extends generally diametrically through a generally central portion of said body, and said groove extends generally circumferentially around said body.

10. The fishing net connector according to claim 9, wherein said second cross hole is disposed generally orthogonally to said first cross bore.

11. The fishing net connector according to claim 4, further comprising a lead-in slot disposed along at least a portion of the intersection of said slit with the outer periphery of said body to guide the first twine into engagement within said slit.

12. The fishing net connector according to claim 4, further comprising at least one cross slot extending transversely to and intersecting the portion of said groove that intersects an end of said second cross hole.

* * * * *